Nov. 7, 1967  S. C. BAKER  3,351,086
ADJUSTABLE STRAIGHT-THROUGH FLOW REGULATOR
Filed June 8, 1965
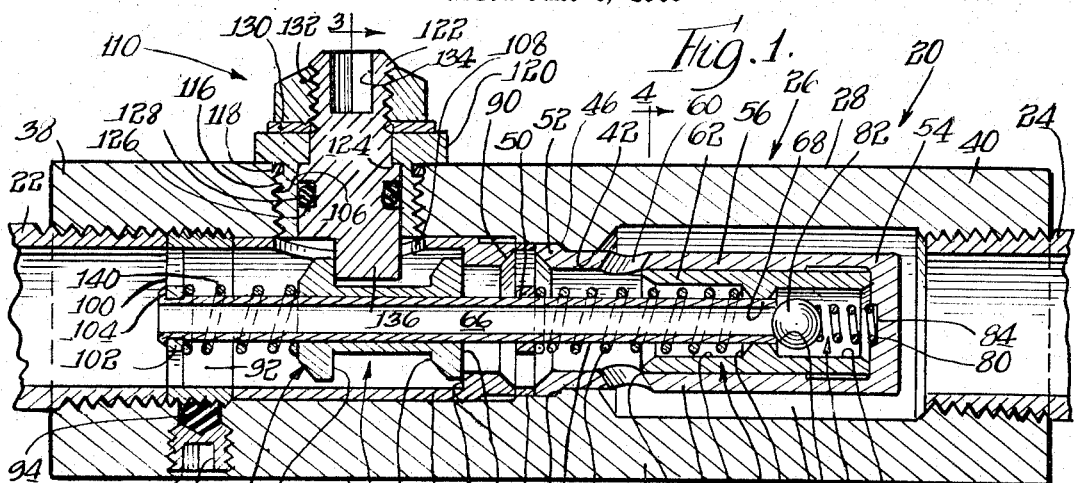
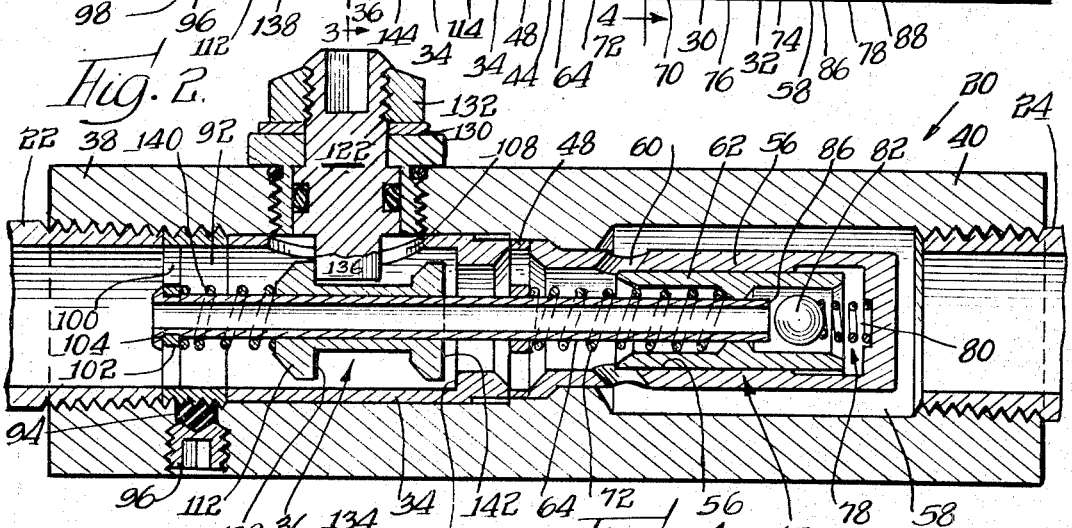
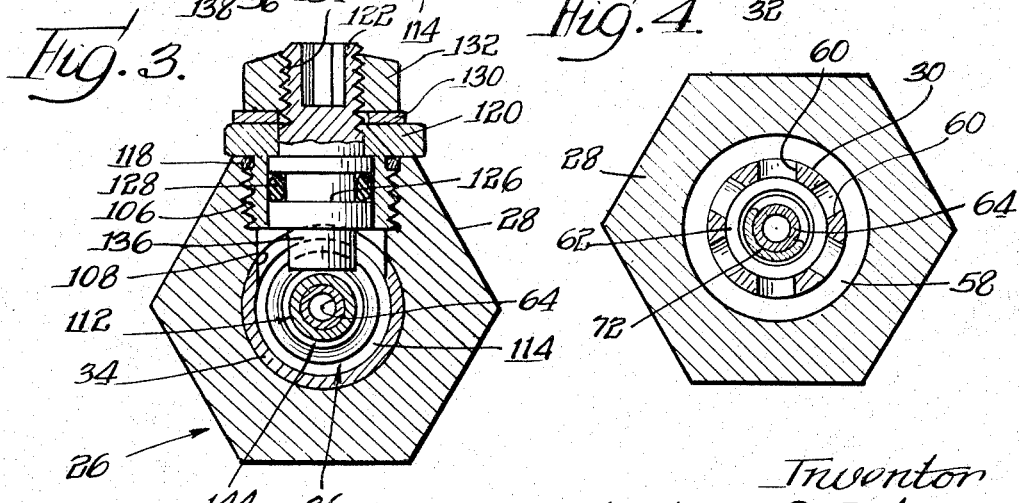
Inventor
Stephen C. Baker
By: Olson, Trexler, Wolters & Bushnell
Attys.

United States Patent Office 3,351,086
Patented Nov. 7, 1967

3,351,086
ADJUSTABLE STRAIGHT-THROUGH FLOW
REGULATOR
Stephen C. Baker, Hinsdale, Ill. (% Ste-Art Co.,
1611 S. Newberry Ave., Chicago, Ill. 60608)
Filed June 8, 1965, Ser. No. 462,332
6 Claims. (Cl. 137—501)

ABSTRACT OF THE DISCLOSURE

A pressure-compensating valve wherein an eccentric cam radially penetrates the valve housing for adjusting a spring-biased poppet valve relative to a valve seat in order to regulate the target rate of flow. A radially ported, internal sleeve has a downstream end and receives slidably a first tubular element, a second tubular element being disposed within the first tubular element to direct flow against a spring-biased valve ball for selectively liberating an expansion of fluid behind the slidable tubular element so as to relocate that member and partially close or partially open the radial ports for maintaining constant volume flow.

This invention relates generally to flow regulating valves and more particularly to flow regulating valves in which arrangement is made for adjusting the normal rate of flow through the unit.

Many types of valve arrangements have been provided heretofore for regulating the flow through a fluid transfer system to some preselected rate. In certain types of these prior art flow regulating valves, the target rate of flow has been established at the time of manufacture by the selection of the size of critical orifices. In other types, the target rate is made to be adjustable. However, the adjustment has been achieved ordinarily by deflecting the flow through the valve at an angle and by positioning the adjustment mechanism in line with one of the flow directions. Such arrangements lose the advantages of straight-through flow.

An important object of the present invention is therefore to provide an adjustable, flow regulating valve which is arranged for straight-through flow.

A more general object of the invention is to provide a new and improved flow regulating valve of the adjustable type.

Another object of the invention is to provide an adjustable, flow regulating valve in which adjustments are made in a particularly easy and convenient manner.

These and other objects and features of the invention will become more apparent from a consideration of the following descriptions.

A flow regulating valve in accord with the invention includes a housing having an inlet and an outlet disposed in straight line relationship and a flow control arrangement. The flow control arrangement comprises a seat, an axially shiftably mounted poppet valve, and a cam unit laterally penetrating the housing to control the position of the poppet valve with respect to the seat.

The invention, both as to its structure and its mode of operation, will be better understood by reference to the following disclosure and drawing forming a part thereof wherein:

FIG. 1 is a longitudinal sectional view taken through a portion of a fluid transfer system incorporating adjustable, flow regulating valve means constructed in compliance with the principles of the present invention, the pressure compensating means being shown in normal condition and the cam-operated poppet valve being illustrated in one position of relative adjustment;

FIG. 2 is a view similar to the showing of FIG. 1 but illustrating the pressure compensating means in position for accommodating a pressure surge and the cam-operated poppet valve being shown in a different position of relative adjustment;

FIG. 3 is a view taken substantially through the section 3—3 of FIG. 1; and

FIG. 4 is a view taken substantially through the section 4—4 of FIG. 1.

Referring now in detail to the drawing, specifically to FIG. 1, a fluid transfer system indicated generally by the numeral 20 is arranged to include an upstream conduit 22, a downstream conduit 24 and an adjustable, flow regulating valve 26 that is situated generally between the conduits 22 and 24. The transfer system 20 is intended to transmit a fluid, for example oil, which is to be used as a force transfer medium; and the transmitted fluid is intended to be urged downstream under pressure to accomplish a particular task and to be returned upstream for relaxing the work implement. As will be recognized, the illustrated system may be used in hydraulic hoists, fork lift trucks and similar equipment.

Continuing with reference to FIG. 1, the flow regulating valve 26 is seen to be made up of a tubular valve body or housing 28, a first sleeve unit 30, a pressure compensating arrangement 32 that is associated with the sleeve unit 30, a second sleeve unit 34, and a flow control unit 36 that is associated with the sleeve unit 34. The housing 28 is fashioned with an inlet end 38 and an outlet end 40 which are disposed in straight line relationship and which are internally threaded for connection respectively to the externally threaded ends of conduits 22 and 24. In addition, the housing 28 is provided with a generally medial constriction 42 that defines a frusto-conical shoulder 44, shoulder 44 contactingly receiving a matably shaped, radially projecting surface 46 of the sleeve unit 30. An apertured washer 48 engages the upstream end of sleeve unit 30 to provide an axial passageway through the valve end to define an annular, center support 50 the purpose of which will be brought out more fully hereinafter.

The sleeve unit 30 is made up of an upstream end or mouth 52 which opens generally into the inlet end 38 of the housing 28, the sleeve unit 30 additionally including a closed end or wall 54 and a tubular wall 56. The closed end or wall 54 is disposed facing in the downstream direction confronting the outlet defined by conduit 24, and the tubular wall 56 is arranged generally coaxially with the housing 28 spaced radially inwardly from the interior wall of that member to define an annular flow passageway 58. In addition, the tubular wall 56 is fashioned with circumferentially spaced, generally radially opening ports 60 which communicate the interior of the sleeve unit 30 with the passageway 58. The ports 60 are generally inclined from the longitudinal axis of sleeve unit and in a slight downstream direction to facilitate movement of fluid from the mouth 52 into the passageway 58.

In compliance with the features of the invention, the pressure compensating arrangement 32 cooperates with the sleeve unit 30 in regulating the flow through the ports 60. Broadly, the pressure compensating arrangement 32 comprises a pair of coaxial, relatively slidable, tubular elements and a valve element that selectively opens the downstream end of one of the tubular elements to pass inlet fluid into contact with the downstream end of the other tubular element. Specifically, a tubular piston 62 is slidably disposed in the tubular wall 56 of sleeve unit 30, and a conduit 64 is fixed in position with respect to housing 28, being disposed to define an axial flow passageway 66. The piston 62 is fashioned with an interior guide surface 68 which slidably engages the exterior surface of conduit 64, and the piston 62 is additionally provided with a valve surface 70 which is disposed to cooperate with the ports 60 in regulating the flow of fluid therethrough, axial movement of the piston 62 in a generally upstream direction partially obstructing the ports to resrtict flow in a manner to be described more fully hereinafter.

The piston 62 is intended to be biased generally out of obstructing relationship relative to the ports 60; and for this purpose, a compression spring 72 is coiled about the conduit 64 as a spring guide to be confined between an annular abutment wall defined by the center support 50 of washer 48 and an annular wall 74 that is fashioned at the root of a generally cylindrical recess 76, recess 76 opening from the piston 62 in the upstream direction and being sized transversely to pass the coils of spring 72 without contact therewith.

A ball valve unit 78 is arranged to obstruct the flow through conduit 64 in a selective manner and in response to the pressure of the fluid flowing into the inlet of housing 28. The ball valve unit 78 includes a coiled compression spring 80 and a valve ball 82. The spring 80 seats in a recess 84 that is fashioned in the downstream end of sleeve unit 30, and the spring 80 biases the valve ball 82 normally against a seat surface 86 at the end of conduit 64.

The terminal coil of spring 80 fittedly receives a portion of the valve ball 82 to hold the same generally in position; and it is to be recognized that the resiliency of spring 80 permits separation of the valve ball 82 from the seat surface 86 to pass fluid under pressure from the conduit 64 and into contact with the downstream end of the sleeve unit 30. The downstream end of piston 62 is fashioned with a pocket 88, and the walls of this pocket react to the pressure of the fluid that is passed by the valve ball 82 upon its separation from the seat surface 86.

Cooperating with the sleeve 30 and the pressure compensating arrangement 32 is the sleeve 34 and the flow control unit 36. More specifically, the sleeve 34 includes a downstream end 90 which abuts the washer 48 for retaining the same in position against the mouth 52 of sleeve unit 30, thus fixedly mounting the sleeve unit in the housing 28. The sleeve unit 34, in turn, is fixedly mounted in the housing 28 by a threaded collar or nipple 92 which is turned into the upstream end portion 38 in advance of the threaded end of conduit 22. Advantageously, a rubber slug 94 is urged tightly against the collar 92 by means of a set screw 96, set screw 96 being turned into a cooperatively threaded aperture 98 fashioned radially in the housing 28. The collar 92 includes an apertured transverse wall 100, and the wall 100 is fashioned with a central retainer ring 102. The retainer ring 102 is sized to pass snugly a reduced end of the conduit 64, and the passed end of the conduit is flanged over to define an annular head 104 which secures the retainer ring 102 against a shoulder which is generated at the root of the reduced end of the conduit. In addition to the support provided by the retainer ring 102 in collar 92, the conduit 64 is slidably fittedly received in the central support 50 of washer 48. For purposes of providing lateral access to the flow control unit 36, the housing 28 is provided with an internally threaded, radial bore 106 and the sleeve unit 34 is cut with a hole 108, hole 108 being aligned with the bore 106 to define a lateral recess opening through the valve body or housing 28.

In compliance with the features of the invention, the flow control unit 36 includes a cam arrangement 110 that is disposed in the aforementioned lateral recess, a poppet valve member 112 which is slidably disposed on conduit 64, and an annular valve seat 114 which is fashioned at the downstream end of sleeve 34. The cam arrangement 110 includes a tubular bushing 116 that is threaded into the bore 106, a rubber O-ring 118 being seated beneath an external head portion 120 of the bushing 116 to provide a seal. A crank member 122 is rotatably disposed in the bushing 116, and the head portion 120 of the bushing is provided with a radially inwardly extending shoulder 124 which serves to retain the crank member 122 in place. The crank member 122 is fashioned with an annular groove 126 and a rubber O-ring 128 is disposed in this groove to provide a seal. In order to retain the crank member 122 against the shoulder 124, a nylon washer 130 is situated beneath a nut 132. In addition, the crank member 122 is provided at its outer extremity with a tool-engageable recess 134 which is particularly shaped to receive matably an Allen wrench for use in rotating the crank member relative to the housing 26. Such rotation of the crank member produces angular movement of a cylindrical cam element 136 which projects toward the conduit 64 from the inner extremity of the crank member, cam element 136 being eccentrically located with respect to the rotational axis of crank member 122.

For purposes of cooperating with the cylindrical surface of cam 136, the poppet valve member 112 is provided with an annular follower surface 138; and advantageously, a compression spring 140 is fitted about the upstream end of conduit 64 generally between the poppet valve member 112 and the retainer ring 102 to bias the follower surface 138 generally against the cam 136 and the poppet valve member 112 in the direction of seat 114. The poppet valve member 112 includes an annular valve surface 142 which is engageable with the seat surface 114. In addition, the poppet valve member 112 is fashioned with a stop surface 144 which is spaced axially from the follower surface 138 by a distance sufficient to permit free axial movement of the poppet valve member for purposes of accommodating uninhibited reverse flow through the housing 28.

For purposes of enhancing the understanding of the invention, a functional description of the operation of flow regulating valve 26 will now be given. Assuming that the valve is coupled to inlet and outlet conduits in the general manner shown in FIGS. 1 and 2, a desired rate of flow will be selected by inserting an Allen wrench in the recess 134 to rotate the crank member 122 and turn the cam member 136 so as to adjust the position of poppet valve member 112 with respect to the seat surface 114. A desired orifice size will be selected in this manner. With the normal rate of flow through the valve 26 thus established, as for example as illustrated in FIG. 2, flow at a predetermined pressure passing through the valve will not alter the normal position of the components in pressure compensating arrangement 32, and these components will remain in the configuration shown in FIG. 1. However, when a surge of fluid presenting a pressure higher than the predetermined pressure is experienced in the valve 26, the conduit 64 will pass the increased pressure to the valve ball 82, the spring 80 compressing in response whereby to permit separation of the valve ball from the seat surface 86 so as to pass fluid into the pocket 88. The expansion of fluid into the pocket 88 urges the piston 62 in a generally upstream direction and into partially obstructing relationship with the ports 60 as is shown in FIG. 2. The valve 26 thus responds automatically to increase in pressure whereby to reduce the orifice defined by ports 60 in proportion to the increase in pressure whereby to maintain the volumetric flow through the valve at a substantially constant value established by the flow control unit 36. As will be recognized, upon dissipation of the surge of increased pressure, the spring 80 will return the valve ball 82 into seated condition relative to the surface 86, permitting the piston 62 to return to a generally non-obstructing condition relative to the ports 60.

It is also to be recognized that reverse flow running generally from the downstream conduit 24 toward the upstream conduit 22 will apply a force to the surface 142 of poppet valve member 112; and this force will tend to compress the spring 140, urging the poppet valve member in a generally upstream direction whereby to open completely the orifice defined at seat surface 114. Thus, easy return through the valve is assured.

The drawing and the foregoing description are not intended to represent the only possible form of my invention in regard to the details of its construction and the manner of its operation. Changes in form and the proportion of parts as well as the substitution of equivalents are contemplated as circumstances may suggest or render expedient; and although specific terms have been employed, they are intended in a generic and descriptive sense only and not for the purposes of limitation, the scope of the invention being defined in the following claims.

The invention is claimed as follows:

1. A flow regulating valve comprising: housing means having an inlet, an outlet and a lateral aperture; cylinder means arranged to define an axial support in said housing means; mounting means for fixing one end of said cylinder means with respect to said housing means; sleeve means in said housing means including a lateral hole aligned with said lateral aperture to cooperate therewith in defining a lateral recess, said sleeve means further including a poppet valve seat; poppet valve means slidably disposed on said cylinder means to coact with said seat in establishing a normal rate of flow and including follower surface means; means for biasing said poppet valve means toward said seat; and cam means in said recess including eccentric cam surface means engageable with said follower surface means to select a position of said poppet valve means relative to said poppet valve seat, said poppet valve means including stop surface means spaced axially from said follower surface means to permit free movement of said poppet valve means for unvalved reverse flow through said housing means.

2. A flow regulating valve comprising: housing means having an inlet and an outlet; sleeve means in said housing means, including an upstream end opening into said inlet, a closed end confronting said outlet, and a tubular wall between said ends spaced radially from said housing to define a first flow passageway and having generally radial ports communicating the interior of said sleeve means with said passageway; pressure compensating means in said sleeve means, including a pair of coaxial tubular elements arranged for relative slidable movement and including a valve element selectively opening the downstream end of one of said tubular elements to pass inlet fluid into contact with the downstream end of the other of said tubular elements, one of said tubular elements having valve surface means disposed to cooperate with said ports in automatically regulating the flow between said inlet and said outlet; and flow control means including seat means, axially shiftably mounted poppet valve means, and cam means laterally penetrating said housing means to control the position of said poppet valve means relative to said seat means.

3. A flow regulating valve according to claim 2 wherein said cam means include a tool-engageable formation exposed exteriorly of said housing means to permit repositioning of said poppet valve means.

4. A flow regulating valve comprising: housing means having an inlet, an outlet and a lateral aperture; first sleeve means in said housing means, including an upstream end opening into said inlet, a closed end confronting said outlet, and a tubular wall between said ends spaced radially from said housing to define a first flow passageway and having generally radial ports communicating the interior of said sleeve means with said passageway; tubular piston means slidably disposed in said sleeve means, including valve surface means arranged to cooperate with said ports in regulating the flow between said inlet and said outlet; conduit means arranged to define a second flow passageway opening from said inlet and through said piston means, said conduit means having an open end facing the closed end of said sleeve means; mounting means for fixing the upstream end of said conduit means with respect to said housing means; means for biasing said piston means toward the closed end of said sleeve means; valve means arranged to obstruct the flow through said conduit means selectively and in response to the pressure of the fluid flowing into said inlet; second sleeve means in said housing means between said first sleeve means and said mounting means and including a lateral hole aligned with said lateral aperture to cooperate therewith in defining a lateral recess, said second sleeve means further including a poppet valve seat; poppet valve means slidably disposed on said conduit means to coact with said seat in establishing a normal rate of flow and including follower surface means; and cam means in said recess including surface means engageable with said follower surface means to select a position of said poppet valve means relative to said poppet valve seat.

5. A flow regulating valve comprising: housing means having an inlet, an outlet and a lateral aperture; first sleeve means in said housing means, including an upstream end opening into said inlet, a closed end confronting said outlet, and a tubular wall between said ends spaced radially from said housing to define a first flow passageway and having generally radial ports communicating the interior of said sleeve means with said passageway; tubular piston means slidably disposed in said sleeve means, including valve surface means arranged to cooperate with said ports in regulating the flow between said inlet and said outlet; conduit means arranged to define a second flow passageway opening from said inlet and through said piston means, said conduit means having an open end facing the closed end of said sleeve means; mounting means for fixing the upstream end of said conduit means with respect to said housing means; means for biasing said piston means toward the closed end of said sleeve means; valve means arranged to obstruct the flow through said conduit means selectively and in response to the pressure of the fluid flowing into said inlet; second sleeve means in said housing means between said first sleeve means and said mounting means and including a lateral hole aligned with said lateral aperture to cooperate therewith in defining a lateral recess, said second sleeve means further including a poppet valve seat; poppet valve means slidably disposed on said conduit means to coact with said seat in establishing a normal rate of flow and including follower surface means; means for biasing said poppet valve means toward said seat; and cam means in said recess including eccentric cam surface means engageable with said follower surface means to select a position of said poppet valve means relative to said poppet valve seat, said poppet valve means including stop surface means spaced axially from said follower surface means to permit free movement of said poppet valve means for unvalved reverse flow through said housing means.

6. A flow regulating valve according to claim 1 wherein the means for biasing the poppet valve comprises a compression spring disposed relatively upstream of said poppet valve.

References Cited

UNITED STATES PATENTS

| 293,778 | 3/1961 | Baker | 137—501 |
| 3,064,676 | 11/1962 | Baker | 137—501 |

FOREIGN PATENTS 470,445  11/1950  Italy.

M. CARY NELSON, *Primary Examiner.*

R. J. MILLER, *Assistant Examiner.*